United States Patent
Paul et al.

(10) Patent No.: US 9,946,319 B2
(45) Date of Patent: Apr. 17, 2018

(54) SETTING POWER-STATE LIMITS BASED ON PERFORMANCE COUPLING AND THERMAL COUPLING BETWEEN ENTITIES IN A COMPUTING DEVICE

(71) Applicant: Advanced Micro Devices, Inc., Sunnyvale, CA (US)

(72) Inventors: Indrani Paul, Round Rock, TX (US); Manish Arora, Dublin, CA (US); Srilatha Manne, Portland, OR (US); William L. Bircher, Austin, TX (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 341 days.

(21) Appl. No.: 14/059,384

(22) Filed: Oct. 21, 2013

(65) Prior Publication Data

US 2014/0143565 A1 May 22, 2014

Related U.S. Application Data

(60) Provisional application No. 61/728,236, filed on Nov. 20, 2012.

(51) Int. Cl.
*G06F 1/32* (2006.01)
*G06F 1/20* (2006.01)

(52) U.S. Cl.
CPC .......... *G06F 1/3206* (2013.01); *G06F 1/206* (2013.01)

(58) Field of Classification Search
CPC ........ G06F 1/206; G06F 1/3206; G06F 1/324; G06F 1/3234; G06F 1/32963
See application file for complete search history.

(56) References Cited

U.S. PATENT DOCUMENTS

| | | | |
|---|---|---|---|
| 7,111,179 B1* | 9/2006 | Girson et al. | 713/300 |
| 7,945,885 B2* | 5/2011 | Hoberman et al. | 716/133 |
| 8,688,883 B2* | 4/2014 | Guddeti et al. | 710/260 |
| 8,775,830 B2* | 7/2014 | Sur et al. | 713/300 |
| 8,954,770 B2* | 2/2015 | Ananthakrishan et al. | 713/320 |
| 9,026,815 B2* | 5/2015 | Ananthakrishnan et al. | 713/320 |
| 9,063,727 B2* | 6/2015 | Man et al. | |
| 2002/0194509 A1* | 12/2002 | Plante et al. | 713/300 |
| 2005/0288886 A1* | 12/2005 | Therien et al. | 702/130 |
| 2008/0098254 A1* | 4/2008 | Altevogt | G06F 1/3203 713/600 |
| 2008/0172565 A1* | 7/2008 | Chu | G06F 1/26 713/300 |
| 2008/0282102 A1* | 11/2008 | Reddy et al. | 713/323 |
| 2008/0307238 A1* | 12/2008 | Bieswanger et al. | 713/300 |
| 2009/0172375 A1* | 7/2009 | Rotem et al. | 713/1 |

(Continued)

OTHER PUBLICATIONS

Wang, Workload and Power Budget Partitioning for Single Chip Heterogeneous Processors, PACT, 2012.

*Primary Examiner* — Thomas Lee
*Assistant Examiner* — Gary Collins
(74) *Attorney, Agent, or Firm* — Park, Vaughan, Fleming & Dowler LLP

(57) ABSTRACT

The described embodiments include a computing device with a first entity and a second entity. In the computing device, a management controller dynamically sets a power-state limit for the first entity based on a performance coupling and a thermal coupling between the first entity and the second entity.

20 Claims, 5 Drawing Sheets

(56) References Cited

U.S. PATENT DOCUMENTS

| | | | |
|---|---|---|---|
| 2010/0162006 A1* | 6/2010 | Therien | G06F 9/50 713/300 |
| 2011/0055597 A1* | 3/2011 | Wyatt | 713/300 |
| 2011/0113270 A1* | 5/2011 | Carter et al. | 713/320 |
| 2012/0110352 A1* | 5/2012 | Branover et al. | 713/300 |
| 2012/0271481 A1* | 10/2012 | Anderson et al. | 700/299 |
| 2012/0272086 A1* | 10/2012 | Anderson et al. | 713/340 |
| 2012/0324248 A1* | 12/2012 | Schluessler | G06F 1/3253 713/300 |
| 2013/0080795 A1* | 3/2013 | Sistla et al. | 713/300 |
| 2013/0080804 A1* | 3/2013 | Ananthakrishan et al. | 713/320 |
| 2013/0097443 A1* | 4/2013 | Li | G06F 1/3206 713/322 |
| 2013/0111236 A1* | 5/2013 | Ananthakrishnan et al. | 713/320 |
| 2014/0068291 A1* | 3/2014 | Man et al. | 713/320 |
| 2014/0082378 A1* | 3/2014 | Schluessler | G06F 1/26 713/300 |
| 2014/0082380 A1* | 3/2014 | Schluessler | G06F 1/26 713/300 |
| 2014/0181536 A1* | 6/2014 | Naffziger | G06F 1/26 713/300 |

* cited by examiner

SETTING POWER-STATE LIMITS BASED ON PERFORMANCE COUPLING AND THERMAL COUPLING BETWEEN ENTITIES IN A COMPUTING DEVICE

RELATED CASES

This application is a non-provisional application from, and hereby claims priority under 35 U.S.C. § 119 to, U.S. provisional patent application No. 61/728,236, which is titled "Cooperative Boosting: Needy Versus Greedy Power Management," by Indrani Paul, Manish Arora, and Srilatha Manne, which was filed on 20 Nov. 2012, and which is incorporated by reference.

BACKGROUND

Field

The described embodiments relate to computing devices. More specifically, the described embodiments relate to setting power-state limits based on performance coupling and thermal coupling between heterogeneous entities in a computing device.

Related Art

Many computing devices include two or more heterogeneous entities that perform operations in the computing devices. For example, computing devices can include one or more central processing units (CPUs), one or more graphics processing units (GPUs), and/or one or more accelerated processing units (APUs). As another example, computing devices can include one or more full-power processors and one or more low-power or embedded processors.

In some computing devices, two or more entities work together on shared workloads, with each entity performing a portion of the operations for the workloads. When working together on a shared workload, some or all of the entities may rely on results output from other entities as inputs for operations for a corresponding portion of the shared workload. In this case, improperly balancing the performance of the entities can lead to sub-optimal performance for some or all of the entities (or the computing device as a whole). As an example, assuming that the computing device includes two entities, if a first entity is able to perform its share of the operations for the shared workload quickly, but does not receive inputs from or cannot send outputs to a second entity because the second entity is not able to perform its share of the operations as quickly, the first entity experiences delay and may unnecessarily consume power and generate heat if the first entity is operated at a higher power-state limit (with corresponding higher frequencies, voltages, etc.).

Most computing devices with heterogeneous entities also operate with temperature constraints on the entities to avoid damaging components in the computing device, including the entities themselves. For example, the entities may each have an operating temperature threshold. During operation, when an entity exceeds the corresponding operating temperature threshold, the entity is throttled (i.e., forced to operate at a lower power-state limit). In some of these computing devices, the entities are free to operate at higher power-state limits, as long as the entities do not exceed corresponding operating temperature thresholds.

Because entities can compute faster using higher power-state limits, allowing the entities to operate at higher power-state limits under the temperature constraints for the entity can enable efficient operation. However, maximizing one entity's power-state limit can sometimes negatively effect the operation of other entities in the computing device. For example, consider a first entity operating at a highest power-state limit while performing operations in a shared workload that includes more operations that are to be performed by the second-entity. This can happen, for example, when a shared workload is being executed by a CPU and a GPU when more of the operations are GPU-oriented operations, but the CPU is operating in the highest power-state limit. In such a case, the first entity operating at the highest power-state limit could heat up the second entity (particularly in the case that the first entity and second entity are on the same integrated circuit chip) and constrain the performance of the second entity by causing the second entity to be throttled due to the thermal constraint on the second entity. Thus, simply allowing entities to operate at higher power-state limits as long as the entities do not exceed corresponding operating temperature thresholds can sometimes result in less efficient overall operation of the computing device.

BRIEF DESCRIPTION OF THE FIGURES

Throughout the figures and the description, like reference numerals refer to the same figure elements.

DETAILED DESCRIPTION

Figure 1:
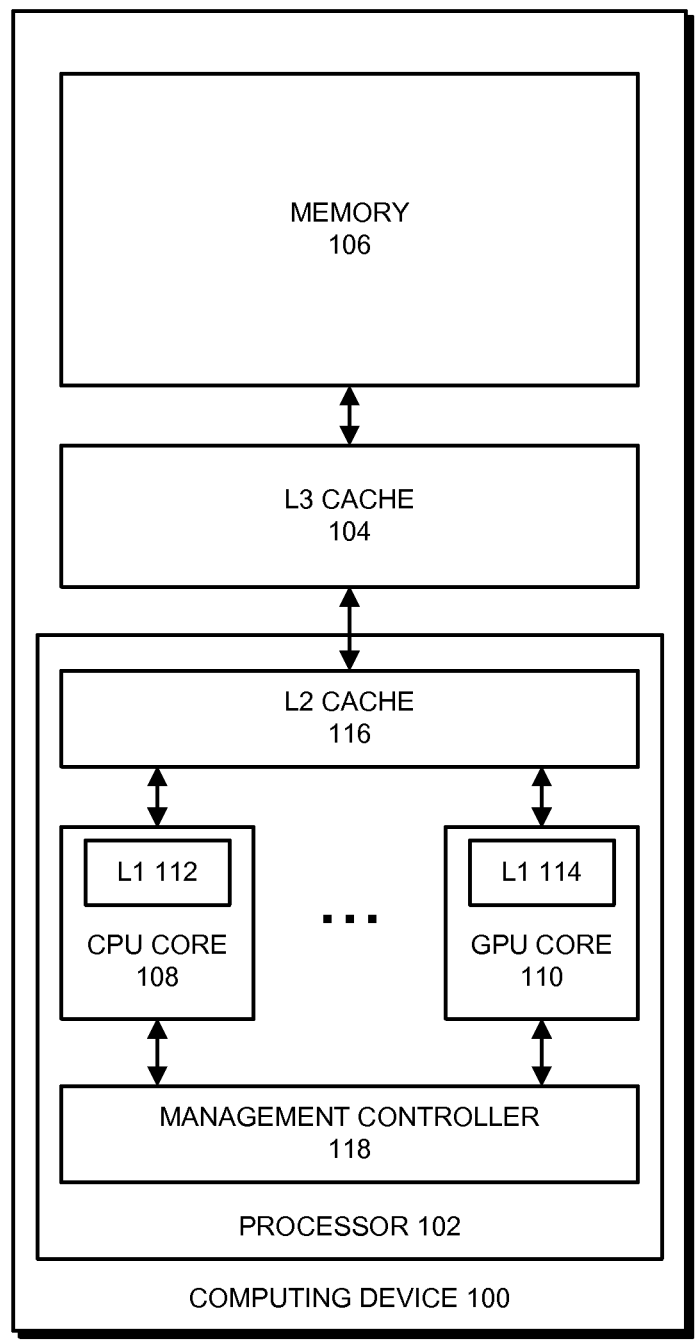
FIG. 1 presents a block diagram illustrating a computing device in accordance with some embodiments.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

Terminology

In the following description, various terms may be used for describing embodiments. The following section provides a simplified and general description of some of these terms. Note that some or all of the terms may have significant additional aspects that are not recited herein for clarity and brevity and thus these descriptions are not intended to limit the terms.

Entities: in some embodiments, entities include a portion of the hardware in a computing device and/or software executing on a computing device that can perform the operations herein described. For example, entities can include, but are not limited to, one or more processors (e.g., CPUs, GPUs, APUs, etc.), one or more processor cores (e.g., CPU cores, GPU cores, etc.), an embedded processor, a compute unit in a processor core, an application-specific integrated circuit (ASIC), a functional block, and/or one or more threads executing on one or more of the above-described entities, or some combination thereof.

Thermal coupling: many hardware entities such as CPU cores, GPU cores, etc. in computing devices generate heat as they operate (e.g., due to resistive heating in semiconductor circuits from state switches/leakage, etc.). Thermal coupling is the tendency for a given entity in a computing device to heat up other entities in the computing device when generating heat. For example, assuming a first entity and a second entity are both located on a semiconductor die, when the first entity is operating, heat generated by the first entity can, via conduction, heat an area of the semiconductor die occupied by the second entity, thereby raising the temperature of the second entity. Because more heat can be generated by an entity operating with a high power-state limit (e.g., at a relatively high frequency, voltage, etc.), more heat can be thermally coupled to other entities when the entity is operating with the high power-state limit.

Performance coupling: in some embodiments, an entity in a computing device rely on results produced by other entities as inputs for operations to be performed by the entity. For example, two entities may be working together on a shared workload, with a first entity performing some operations for the workload and a second entity performing other operations. For the shared workload, one or both of the entities may use the outputs from the other of the other entities as inputs for operations for the entity. In this case, performance coupling occurs because one or both of the entities can be delayed (i.e., can perform computational operations at less than an optimal rate) when the other entity is not producing and/or accepting results quickly enough to enable the entity to perform corresponding operations. In contrast, when the other entity produces results quickly enough, one or both entities are not prevented from performing computational operations at an optimal rate.

Overview

The described embodiments include a computing device with two or more entities that perform computational operations. For example, in some embodiments, the computing device includes a central processing unit (CPU) core and a graphics processing unit (GPU) core on a semiconductor die (a two-entity embodiment is used as an example, embodiments with more entities function in a similar way). The described embodiments monitor performance coupling and thermal coupling between the entities and dynamically set a power-state limit for one or more of the entities based on the monitored performance coupling and thermal coupling. In these embodiments, the computing device sets the power-state limit for one or both of the entities to an optimal power-state limit (e.g., to operate the corresponding entity at appropriate frequencies, voltages, etc.) to enable better performance for both of the entities while avoiding overheating the entities and/or unnecessarily operating the entities with a high power-state limit (i.e., to conserve power).

In some embodiments, during operation, to monitor thermal coupling, the computing device monitors one or more temperatures for one or both of the entities. To monitor performance coupling, the computing device monitors one or more performance metrics for one or both of the entities. For example, the computing device may acquire temperature readings from various locations using corresponding sensors for one or both of the entities and may acquire performance metrics from hardware or software reporting mechanisms for one or both of the entities. The computing device then uses the monitored temperatures to determine which, if either, of the entities is approaching one or more threshold temperature(s) and uses the measured performance metrics to determine the profile of a workload being executed by the entities (e.g., whether one of the entities is currently performing more operations for a shared workload). The computing device dynamically sets the power-state limits for one or both of the entities according to both the temperatures of the entities with respect to the threshold(s) and the profile of the workload.

By using both thermal coupling and performance coupling to set power-state limits, the described embodiments can more optimally set power-state limits, particularly when compared to earlier computing devices that set power-state limits based on temperature alone. The improvement in power-state limit setting enables entities to operate at appropriate frequencies, voltages, etc. for existing operating conditions, which can result in improved performance for the entities and, more generally, the computing device.

Computing Device

FIG. 1 presents a block diagram illustrating a computing device 100 in accordance with some embodiments. As can be seen in FIG. 1, computing device 100 includes processor 102, L3 cache 104, and memory 106. Processor 102 is a functional block (e.g., a microprocessor, an accelerated processing unit (APU), a system on a chip (SOC), etc.) that performs computational operations in computing device 100. As can be seen in FIG. 1, processor 102 includes CPU core 108, GPU core 110, and L2 cache 116. CPU core 108 is a functional block such as a microprocessor core, an application-specific integrated circuit (ASIC), a microcontroller, a programmable logic device, and/or an embedded processor that is configured to perform general computational operations in computing device 100. GPU core 110 is a functional block such as a graphics processor core that is configured to efficiently perform operations related to graphics processing. In the described embodiments, GPU core 110 is a general-purpose GPU core, and thus is further configured to accept sections of program code from CPU core 108 for processing in GPU core 110. For example, GPU core 110 may accept program code from CPU core 108 that includes operations such as single-instruction-multiple-data (SIMD) and other types of operations that GPU core 110 is configured to perform (and may, in some cases, perform more efficiently than CPU core 108).

CPU core 108 and GPU core 110 include cache memories (or "caches") L1 cache 112 ("L1 112") and L1 cache 114 ("L1 114"), respectively. L1 cache 112 and L1 cache 114 include memory circuits (e.g., one or more of static random access memory (SRAM), dynamic random access memory (DRAM), double data rate synchronous DRAM (DDR SDRAM), and/or other types of memory circuits) that are used for storing instructions and data that are used by CPU core 108 and GPU core 110, respectively, for performing computational operations. Generally, L1 caches 112 and 114 are the smallest of a set of caches in computing device 100 and are located closest to processing circuits (e.g., compute/execution units, instruction fetch units, etc.) in the respective core. The closeness of the L1 caches 112 and 114 to the corresponding processing circuits enables the fastest access to the instructions and data stored in the L1 caches 112 and 114 from among the caches in computing device 100.

Level-two cache 116 in processor 102 is shared by CPU core 108 and GPU core 110 and includes memory circuits (e.g., one or more of SRAM, DRAM, DDR SDRAM, and/or other types of memory circuits) that are used for storing instructions and data that are used by CPU core 108 and GPU core 110, respectively, for performing computational operations. L2 cache 116 is larger than L1 caches 112 and 114 and is located outside, but close to, CPU core 108 and GPU core 110 (e.g., on a same semiconductor die). Because L2 cache 116 is located outside the cores, access to the instructions and data stored in L2 cache 116 is slower than accesses to L1 caches 112 and 114.

L3 cache 104 is shared by CPU core 108 and GPU core 110 and includes memory circuits (e.g., one or more of static random access memory (SRAM), dynamic random access memory (DRAM), double data rate synchronous DRAM (DDR SDRAM), and/or other types of memory circuits) that are used for storing instructions and data that are used by CPU core 108 and GPU core 110, respectively, for performing computational operations. L3 cache 104 is larger than L1 caches 112 and 114 and L2 cache 116 and is located outside processor 102 (e.g., on a different semiconductor die). Because L3 cache 104 is located outside processor 102, access to the instructions and data stored in L3 cache 104 is slower than accesses to the other caches.

Memory 106 comprises memory circuits that form a "main memory" in and for computing device 100. Memory 106 is used for storing instructions and data for use by CPU core 108 and GPU core 110. In some embodiments, memory 106 is significantly larger than the caches in computing device 100 and is fabricated from memory circuits such as one or more of DRAM, SRAM, DDR SDRAM, and/or other types of memory circuits.

Taken together, L1 caches 112 and 114, L2 cache 116, L3 cache 104, and memory 106 form a "memory hierarchy" in and for computing device 100. Each of the caches and memory 106 can be regarded as "levels" of the memory hierarchy, with the lower levels including the larger caches and memory 106. Thus, the highest level in the memory hierarchy includes L1 caches 112 and 114.

Returning to processor 102, management controller 118 is a functional block that performs operations for monitoring thermal coupling and performance coupling between entities in processor 102 and dynamically setting power-state limits based on the monitored thermal coupling and performance coupling. For example, in some embodiments, management controller 118 monitors temperatures for one or both of CPU core 108 (a first entity in processor 102) and GPU core 110 (a second entity) and monitors performance metrics for one or both of CPU core 108 and GPU core 110. From the monitored temperature and performance metrics, management controller 118 determines thermal coupling and performance coupling. Based on the determined thermal coupling and performance coupling, management controller 118 sets power-state limits for one or both of one or both of CPU core 108 and GPU core 110.

Figure 2:
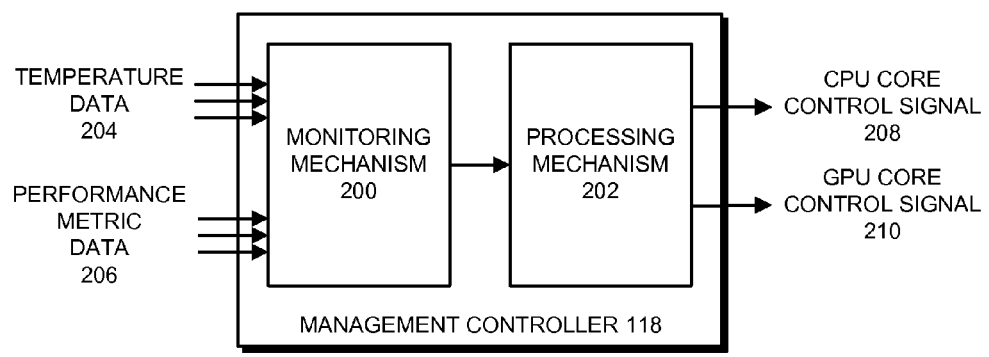
FIG. 2 presents a block diagram illustrating a management controller in accordance with some embodiments.

FIG. 2 presents a block diagram illustrating management controller 118 in accordance with some embodiments. As can be seen in FIG. 2, management controller 118 includes monitoring mechanism 200 and processing mechanism 202. Monitoring mechanism 200 is a functional block that is configured to perform operations for monitoring temperatures and performance metrics for entities in computing device 100. For example, in some embodiments, monitoring mechanism 200 receives temperature data 204 and performance metric data 206 signals from one or both of CPU core 108 and GPU core 110. Monitoring mechanism 200 collects samples (i.e., values, levels, etc.) of the temperature data 204 and performance metric data 206 signals and forwards the samples to processing mechanism 202 for subsequent processing.

Various techniques can be used by monitoring mechanism 200 for sampling temperature data 204 and/or performance metric data 206. For example, in some embodiments, monitoring mechanism 200 samples values received via signal lines as temperature data 204 and performance metric data 206 from sensors coupled to or otherwise associated with CPU core 108 and/or GPU core 110 (e.g., on-die temperature sensors, instruction counters, I/O trackers, memory access counters in one or more levels of the memory hierarchy, etc.). As another example, in some embodiments, monitoring mechanism 200 sends a request to one or both of CPU core 108 and GPU core 110 (e.g., sends an appropriately-formatted request message to an operating system or a hardware monitoring mechanism) and receives a response with corresponding temperature samples and/or performance metric samples as temperature data 204 and performance metric data 206.

In some embodiments, monitoring mechanism 200 includes mechanisms (e.g., memory circuits, etc.) for keeping records of samples of one or more of temperature data 204 and performance metric data 206. For example, monitoring mechanism 200 may keep a last N samples of one or both of temperature data 204 and performance metric data 206.

Processing mechanism 202 is a functional block that is configured to perform operations for determining a thermal coupling and a performance coupling between entities in processor 102 and for dynamically setting power-state limits for the entities based on the thermal coupling and performance coupling. In some embodiments, processing mechanism 202 receives information based on temperature data 204 and performance metric data 206 (e.g., one or more samples of temperature and/or performance metric information) from monitoring mechanism 200. For example, processing mechanism 202 may receive information about temperatures and/or performance metrics in one or both of CPU core 108 and GPU core 110. Processing mechanism 202 may use the information to determine which, if either, of CPU core 108 and GPU core 110 is approaching one or more threshold temperature(s) and to determine the profile of a workload being executed by CPU core 108 and GPU core 110 (e.g., whether one of CPU core 108 and GPU core 110 is currently performing more operations for a shared workload). Processing mechanism 202 then dynamically sets the power-state limits for one or both of CPU core 108 and GPU core 110 based on both the temperatures of the entities with respect to the threshold(s) and the profile of the workload. For example, in some embodiments, processing mechanism 202 can send a signal (e.g., a message, a specified voltage, etc.) on CPU core control signal 208 and/or GPU core control signal 210 to cause a respective one of CPU core 108 and GPU core 110 to use a corresponding power-state limit.

Note that, in some embodiments, computing devices 100 pay a non-linear penalty in power-for-performance when operating in higher power states. This is true because higher power-states consume relatively more power for relatively lower gains in performance. This may mean that operating in higher power-states creates relatively higher amounts of heat, but provides less-than proportional gains in performance.

Although an embodiment is described with a particular arrangement of cores (i.e., CPU core 108 and GPU core 110), some embodiments include different numbers, types, and/or arrangements of cores (as is shown by the ellipsis in FIG. 1). For example, some embodiments have two, five, eight, or another number of CPU and/or GPU cores. As another example, in some embodiments, one or both of CPU core 108 and GPU core 110 are different types of cores or functional blocks. For instance, in some embodiments, GPU core 110 is replaced with a low-power CPU core (i.e., a CPU core configured to perform computational operations while consuming less electrical power). Generally, the described embodiments can use any arrangement of cores that can perform the operations herein described.

Additionally, although an embodiment is described with a particular arrangement of caches, some embodiments include a different number and/or arrangement of caches. For example, the caches (e.g., L1 caches 112 and 114, etc.) can be divided into separate instruction and data caches. As another example, some embodiments include different levels of caches, from only one level of cache to multiple levels of caches, and these caches can be located in CPU core 108 and GPU core 110 and/or external to the cores. For instance, some embodiments do not include L3 cache 104. Generally, the described embodiments can use any arrangement of caches that can perform the operations herein described.

Additionally, although management controller 118 is described as performing certain operations, in some embodiments, some or all of these operations are performed elsewhere in computing device 100. For example, in some embodiments, some or all of the monitoring and dynamic power-state setting operations are performed by one or more of the entities (e.g., in CPU core 108, GPU core 110, etc.). As another example, in some embodiments, some or all of management controller 118 is located external to processor 102 (e.g., is located on a support processor in computing device 100 and/or in a remote computing device). Generally, the described embodiments include sufficient hardware and software mechanisms to perform the operations herein described.

Moreover, computing device 100, CPU core 108, and GPU core 110 are simplified for illustrative purposes. In some embodiments, computing device 100, CPU core 108, and/or GPU core 110 include additional mechanisms for performing the operations herein described and other operations. For example, computing device 100, CPU core 108, and/or GPU core 110 can include power systems (batteries, plug-in power sources, etc.), mass-storage devices such as disk drives or large semiconductor memories (as part of the memory hierarchy), media processors, input-output mechanisms, communication mechanisms, networking mechanisms, display mechanisms, etc.

Performance Metrics

As described above, in some embodiments, monitoring mechanism 200 monitors performance metrics that are used for determining performance coupling between entities (e.g., CPU core 108 and GPU core 110) in processor 102. Generally, when determining performance coupling, the monitored performance metrics are used to determine a current profile of a shared workload (e.g., a number of computational operations for the shared workload that are being performed by each entity). For example, in some embodiments monitoring mechanism 200 monitors memory reads by GPU core 110 to enable monitoring mechanism 200 to determine if GPU core 110 is performing a larger portion of the operations for the shared workload than CPU core 108. As another example, monitoring mechanism 200 can monitor instructions per cycle in one or both of CPU core 108 and GPU core 110 to determine when CPU core 108 and/or GPU core 110 are performing a larger portion of the operations for the shared workload. The determined profile of the shared workload is then used to set power-state limits as described herein.

In the described embodiments, the performance metrics collected by monitoring mechanism 200 can include any value that can be sampled, acquired, computed, and/or derived that represents a current computational performance of one or both entities and/or reflects a current profile of the shared workload. For example, performance metrics can include one or more of memory reads and writes, I/O levels, execution unit (e.g., arithmetic logic unit (ALU), etc.) utilization rates, branch prediction miss rates, data-share/cache statistics (e.g., cache misses, etc.), counts of instructions per cycle, idle or busy durations, and/or other metrics for one or both of CPU core 108 and GPU core 110.

Process for Setting Power-State Limits for Entities

Figure 3A:
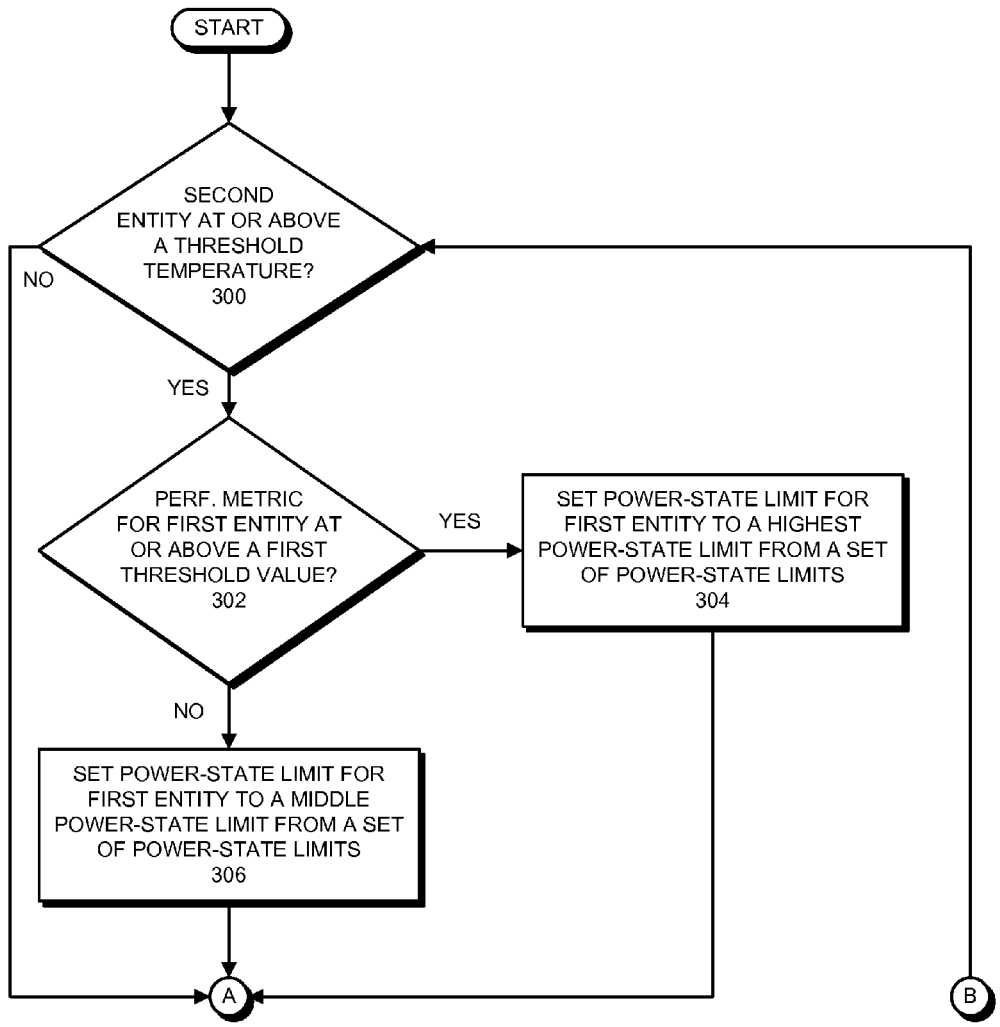
FIGS. 3A-3B (collectively, "FIG. 3") present a flowchart illustrating a process for setting power-state limits based on thermal coupling and performance coupling in accordance with some embodiments.
Figure 3B:
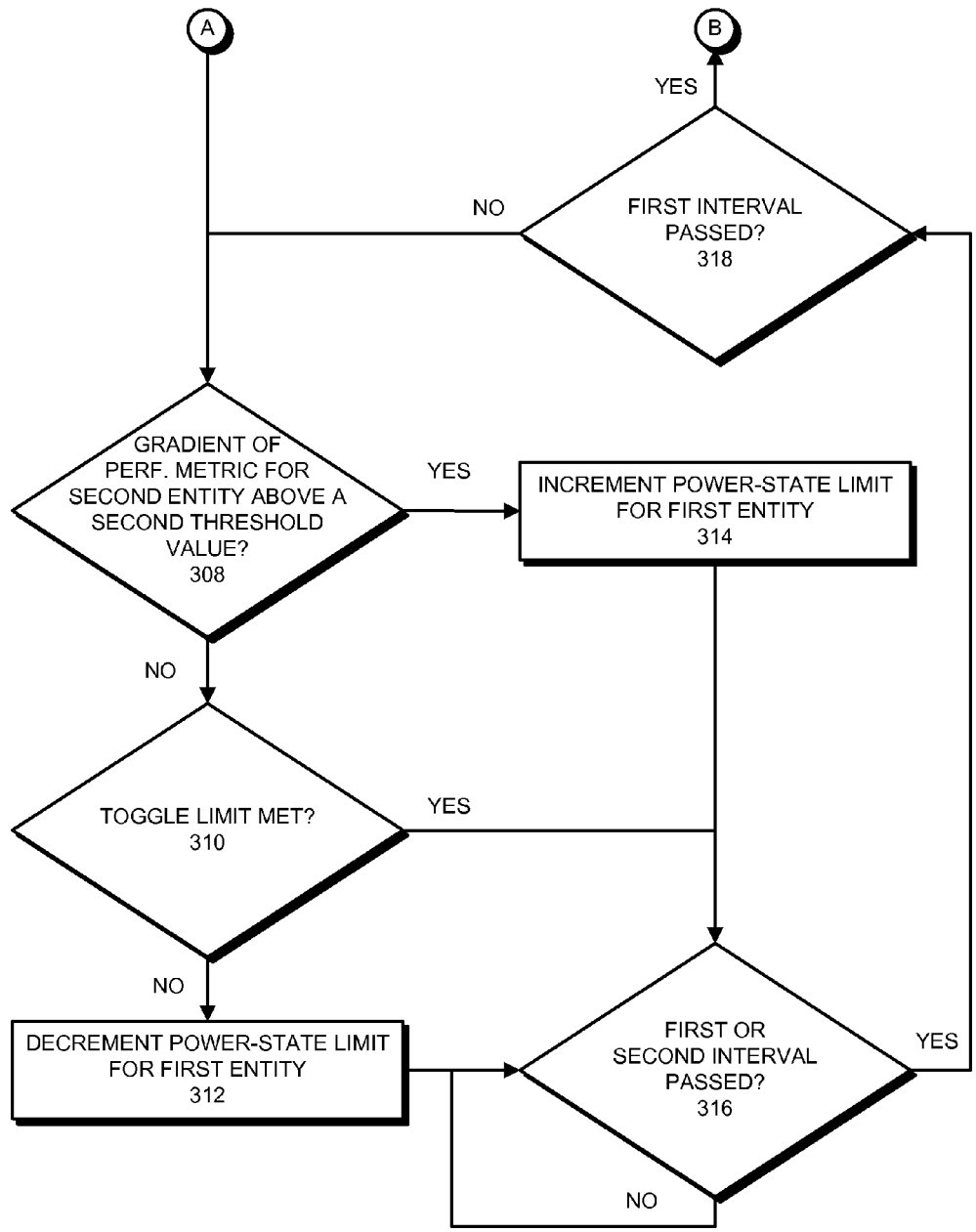

FIGS. 3A-3B (collectively, "FIG. 3") present a flowchart illustrating a process for setting power-state limits based on thermal coupling and performance coupling in accordance with some embodiments. Note that the operations shown in FIG. 3 are presented as a general example of functions performed by some embodiments. The operations performed by other embodiments include different operations and/or operations that are performed in a different order. Additionally, although certain mechanisms (monitoring mechanism 200, processing mechanism 202, etc.) are used in describing the process, in some embodiments, other mechanisms can perform the operations.

In the following example, CPU core 108 (the first entity) and GPU core 110 (the second entity) are the entities used to describe operations performed by some embodiments. However, in some embodiments, similar operations can be performed for other entities in computing device 100. For example, in some embodiments, the first entity is a full-power processor such as a CPU core and the second entity is a low-power processor core such as an embedded or special-purpose processor. Generally, the described operations can be performed for any entities in computing device 100 that have performance coupling and thermal coupling and for which at least one entity can have a power-state limit set. In addition, these operations can be performed for three or more entities (i.e., are not limited to two entities).

The operation shown in FIG. 3 starts when processing mechanism 202, using temperature data acquired from monitoring mechanism 200, determines if GPU core 110 (the second entity) is at or above a threshold temperature (step 300). For example, monitoring mechanism 200 may acquire temperature data collected using sensors for GPU core 110 and pass the temperature data (or information based on the temperature data) to processing mechanism 202. Processing mechanism 202 can then compare the received temperature data or a value computed therefrom (e.g., an average of multiple temperature samples in the data, etc.) to the threshold temperature to determine if GPU core 110 is at or above the threshold temperature.

In some embodiments, the threshold temperature is set at a level above which GPU core 110 operates inefficiently, above which the GPU core 110 may overheat, via thermal coupling, other entities in processor 102, and/or above which sustained operation may damage circuits on GPU core 110. In some of these embodiments, the temperature is a maximum junction temperature for transistors in GPU core 110.

If GPU core 110 is at or above the threshold temperature (step 300), processing mechanism 202 determines if a performance metric for CPU core 108 (the first entity) is at or above a first threshold value (step 302). For example, monitoring mechanism 200 may acquire performance metric data collected using hardware or software sensors for CPU core 108 (e.g., hardware performance tracking mechanisms, application/operating system performance tracking routines, etc.) and pass the performance metric data (or information based on the performance metric data) to processing mechanism 202. Processing mechanism 202 can then compare the received performance metric data or a value computed therefrom (e.g., an average of multiple performance metric samples in the data, etc.) to the first threshold value to determine if CPU core 108 is at or above the first threshold value.

In some embodiments, the first threshold value is set at a level above which a given proportion of operations for a workload that is being shared between CPU core 108 and GPU core 110 are likely being performed by CPU core 108. For example, in some embodiments, the first threshold value is exceeded when the performance metric indicates that the profile of the workload is currently (i.e., approximately at the time when the determination in step 302 is made) such that CPU core 108 is likely performing a given proportion (e.g., 60%, 70%, or another proportion) of the operations for the shared workload. As described above, the performance metric can be any metric that can be used to determine a current profile of a shared workload (e.g., a number of computational operations for the shared workload that are being performed by each entity).

When the performance metric for CPU core 108 is at or above the first threshold value (step 302), processing mechanism 202 sets a power-state limit for CPU core 108 to a highest power-state limit from a set of power-state limits (step 304). Generally, this operation includes adjusting various settings for CPU core 108 to maximum values, thereby enabling CPU core 108 to operate at a corresponding highest power level. For example, one or more clock frequencies, input voltages, input currents, input/output communication bandwidths, resource usage settings, and/or other settings for CPU core 108 can be adjusted to a highest level (or can simply have restrictions removed) to enable the operation at the corresponding highest power level. In some embodiments, processing mechanism 202 sends a signal (e.g., a message, a specified voltage, etc.) on CPU core control signal 208 to cause CPU core 108 to use a corresponding power-state limit.

As described, some embodiments use a "set" of power-state limits. In the set of power-state limits, each power-state limit is associated with one or more operating settings for CPU core 108. For example, each power-state limit may be associated with a clock frequency, a voltage, etc. at which CPU core 108 can operate. During operation, CPU core 108 may be set to any one of the levels in the set of power-state limits and should thereafter use the corresponding settings. In some embodiments, there are 5 or more power-state limits in the set of power-state limits. Note that, in some embodiments, GPU core 110 also has its own set of power-state limits with similar function to the power-state limits for CPU core 108 (but possibly different corresponding clock frequencies, voltages, etc.).

Note that, by checking the temperature of GPU core 110 before making adjustments to the power-state limit of CPU core 108, processing mechanism 202 determines that GPU core 110's operating temperature is at a desired level before possibly increasing the power-state limit for CPU core 108 (and thus the operating frequency, voltage, current, etc. of CPU core 108). This reduces the possibility that heat generated by CPU core 108 while operating under the increased power-state limit will overheat GPU core 110. Thus, these embodiments account for thermal coupling between CPU core 108 and GPU core 110 when making power-state limit changes. This, in turn, ensures that the power-state limit (and thus the performance) of GPU core 110 can be maintained at an optimal level because, for example, GPU core 110 is not obligated to reduce its own power-limit states upon overheating.

When the performance metric for CPU core 108 is not at or above the first threshold value (step 302), processing mechanism 202 sets the power-state limit for CPU core 108 to a middle power-state limit from the set of power-state limits (step 306). Generally, this operation includes adjusting various settings for CPU core 108 to middle values (e.g., by sending a signal to CPU core 108 on CPU core control signal 208, the signal causing CPU core 108 to adjust these settings) thereby enabling CPU core 108 to operate at a corresponding middle power level. For example, one or more clock frequencies, input voltages, input currents, input/output communication bandwidths, resource usage settings, and/or other settings for CPU core 108 can be adjusted to a specified middle level (or can simply be restricted) to enable the operation at the corresponding highest power level. Note that the middle level is a level from the set of power-state limits between a highest power-state limit and a lowest power-state limit, with clock frequencies, input voltages, etc. set accordingly.

By adjusting the power-state limit for CPU core 108 to the middle power-state limit as described, these embodiments lower the operating performance of CPU core 108 when such performance will not likely improve the overall performance of computing device 100 and may unnecessarily heat CPU core 108, GPU core 110, and/or other entities in computing device 100. This helps in conserving electrical power and keeping entities cooler.

Next, processing mechanism 202 determines if a gradient of a performance metric for GPU core 110 is at or above a second threshold value (step 308). More specifically, monitoring mechanism 200 may acquire performance metric data collected using hardware or software sensors for GPU core 110 (e.g., hardware performance tracking mechanisms, application/operating system performance tracking routines, etc.) and pass the performance metric data (or information based on the performance metric data) to processing mechanism 202. Processing mechanism 202 can then compare the gradient of the received performance metric data to the second threshold value to determine if GPU core 110 is at or above the second threshold value.

Figure 4:
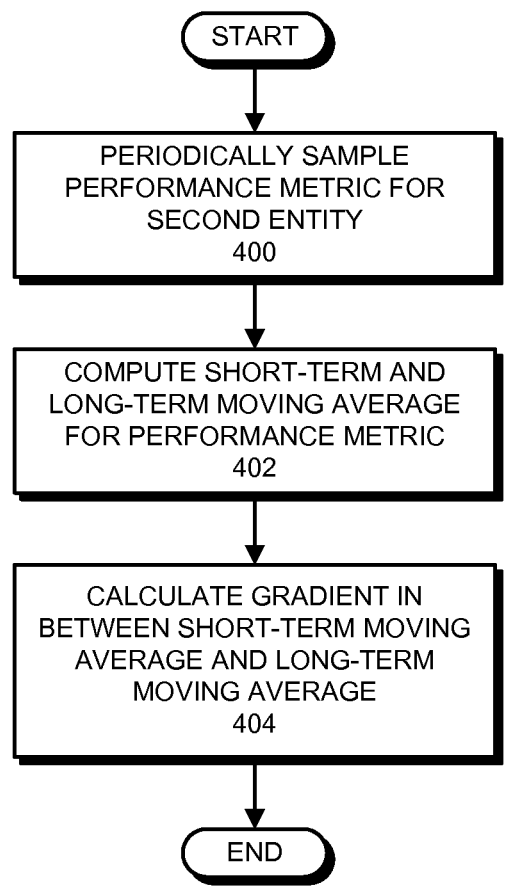
FIG. 4 presents a flowchart illustrating a computation of a gradient in accordance with some embodiments.

In order to make this determination, processing mechanism 202 computes the gradient for the performance metric for GPU core 110. FIG. 4 presents a flowchart illustrating the computation of the gradient in accordance with some embodiments. As can be seen in FIG. 4, processing mechanism 202 first periodically samples (or acquires samples from monitoring mechanism 200) the performance metric for the second entity (step 400). In other words, processing mechanism 202 acquires N samples from a last X ms (e.g., 50 ms, 100 ms, etc.) for the performance metric. Processing mechanism 202 then computes short-term and long-term moving averages for the performance metric (step 402). Processing mechanism 202 next calculates the gradient between the short-term and long-term moving averages (step 404). The gradient represents value changes in the performance metric, but serves to reduce the effect of relatively short-term increases or decreases in the performance metric on observed values for the performance metric.

In some embodiments, the second threshold value is set at a level above which a given proportion of operations for a workload that is being shared between CPU core 108 and GPU core 110 are likely being performed by GPU core 110. For example, in some embodiments, the second threshold value is exceeded when the performance metric indicates that the profile of the workload is currently (i.e., approximately at the time when the determination in step 302 is made) such that GPU core 110 is likely performing a given proportion (e.g., 60%, 70%, or another proportion) of the operations for the shared workload. As described above, the performance metric can be any metric that can be used to determine a current profile of a shared workload (e.g., a number of computational operations for the shared workload that are being performed by each entity).

When the gradient of the performance metric for GPU core 110 is not at or above the second threshold value (step 308), processing mechanism 202 determines if a toggle limit has been met (step 310). In making this determination, processing mechanism 202 determines if a number of times that a power-state limit for CPU core 108 has been toggled in a specified period of time (e.g., 50 ms, 100 ms, etc.) is more than a toggle limit threshold. "Toggled" as used herein indicates: (1) an increment of the power-state limit for CPU core 108 followed by a corresponding decrement of the power-state limit for CPU core 108, or (2) a decrement of the power-state limit for CPU core 108 followed by a corresponding increment of the power-state limit for CPU core 108. For example, assuming that there are 5 power-state limits and that CPU core 108 is initially operating with a 3rd power-state limit, a toggle occurs when the power-state limit for CPU core 108 is decremented to the 2nd power-state limit and then incremented back to the 3rd power-state limit. Processing mechanism 202 makes this determination (and handles the outcome as described below) to avoid cases where the power-limit level is toggled repeatedly, thereby avoiding computational work (changing processor settings, handling data, etc.) associated with repeatedly changing the power-state limit back and forth between two power-state limits. Note that, in some embodiments, other types of toggling could be handled similarly. Generally, in some embodiments, processing mechanism 202 does not decrement (or, in some embodiments, increment) the power-state limit when certain repeated pattern is detected in the changes of the power-state limit.

If the toggle limit has been met (step 310), processing mechanism 202 does not adjust the power-state limit for CPU core 108. Instead, processing mechanism 202 proceeds to step 314 to determine if a first interval has passed (which is described in more detail below). Otherwise, if the toggle limit has not been met, processing mechanism 202 decrements the power-state limit for CPU core 108 to a next lower power-state limit in the set of power-state limits (step 312) (unless CPU core 108 is already in a lowest power-state limit, in which case CPU core 108 is simply left in the lowest power-state limit). For example, assuming that there are 5 power-state limits and that CPU core 108 is operating with a 3rd power-state limit, processing mechanism 202 can decrement a power-state limit for CPU core 108 to the 2nd power-state limit. Generally, this operation includes adjusting various settings for CPU core 108 to corresponding values (e.g., by sending a signal to CPU core 108 on CPU core control signal 208, the signal causing CPU core 108 to adjust these settings), thereby enabling CPU core 108 to operate at the incrementally-lower power level. For example, one or more clock frequencies, input voltages, input currents, input/output communication bandwidths, resource usage settings, and/or other settings for CPU core 108 can be adjusted to the next lower level (or can simply have restrictions enforced) to enable the operation at the corresponding level.

Returning to step 308, when the gradient of the performance metric for GPU core 110 is at or above the second threshold value, processing mechanism 202 increments the power-state limit for CPU core 108 to a next higher power-state limit in the set of power-state limits (step 314) (unless CPU core 108 is already in a highest power-state limit, in which case CPU core 108 is simply left in the highest power-state limit). For example, assuming that there are 5 power-state limits and that CPU core 108 is operating with a 3rd power-state limit, processing mechanism 202 can increment a power-state limit for CPU core 108 to the 4th power-state limit. Generally, this operation includes adjusting various settings for CPU core 108 to corresponding values (e.g., by sending a signal to CPU core 108 on CPU core control signal 208, the signal causing CPU core 108 to adjust these settings), thereby enabling CPU core 108 to operate at the incrementally-higher power level (example settings are described above).

Note that, by decrementing (step 312) or incrementing (step 314) the power-state limit for CPU core 108 based on the gradient of the performance metric for the GPU core 110, processing mechanism 202 configures CPU core 108 with a power-state limit based on the profile of the workload shared between CPU core 108 and GPU core 110. This reduces the possibility that CPU core 108's power-state limit is unnecessarily high when the current profile of the shared workload has GPU core 110 performing a larger number of operations. For example, if the current profile of the workload has CPU core 108 offloading SIMD operations to GPU core 110 and awaiting results from GPU core 110 (i.e., performing a relatively smaller number of operations while GPU core 110 performs a larger number of SIMD operations), processing mechanism 202 may decrement the power-state limit for CPU core 108 to a lower level to conserve power and to ensure that CPU core 108 remains busy while waiting for the results, as well as not overheating GPU core 110 as described above. Thus, these embodiments account for performance coupling between CPU core 108 and GPU core 110 when making power-state limit changes.

After processing mechanism 202 either does not change (step 310), decrements (step 312), or increments (step 314) the power-state limit for CPU core 108, processing mechanism 202 determines if a first or second interval has passed (step 316). In these embodiments, processing mechanism 202 keeps track of two increments, a first interval associated with a measurement of temperature and a corresponding adjustment (or not) of the power-state limit for CPU core 108, and a second interval associated with a measurement of a performance metric for GPU core 110 and a corresponding adjustment (or not) of the power-state limit for CPU core 108. Generally, the first and second intervals can be any amounts of time that enable the setting of power-state limits as described in sufficient time to optimize the operation of one or both of CPU core 108 and GPU core 110. However, in some embodiments, because the effects of thermal coupling (i.e., the heating of one entity by another entity) are slower than the effects of performance coupling (i.e., the slowing of an entity performing operations for a shared workload when results are not available from the other entity), the first interval is longer (e.g., 5-10 times as long) than the second interval. For example, in some embodiments, the first interval is 100 ms and the second interval is 20 ms.

If the first interval has passed (step 318), processing mechanism 202 returns to step 300 to adjust the power-state limit for CPU core 108 (or not) based on temperature (i.e., handling thermal coupling, as described above). Otherwise, if the first interval has not passed (step 318), processing mechanism 202 returns to step 308 to adjust the power-state limit for CPU core 108 (or not) based on workload profile (i.e., handling performance coupling, as described above).

Note that the operations shown in FIG. 3 are dynamic in that the operations occur as CPU core 108 and GPU core 110 are performing operations for a shared workload. This means that processor 102 (and, more generally, computing device 100) can react to changes in temperature and workload as the changes occur (or at least as the first and second intervals pass and processing mechanism 202 performs the operations shown in FIG. 3).

Although embodiments are described using a shared workload, some embodiments handle power-state limits for workloads other than shared workloads and/or handle different types of shared workloads. For example, in some embodiments, the first and second entities execute independent workloads (albeit workloads that can be analyzed using the above-described performance metrics, for which thresholds are set, etc.), but otherwise perform operations similar to those described above.

In some embodiments, a computing device (e.g., computing device 100 in FIG. 1 and/or some portion thereof) uses code and/or data stored on a computer-readable storage medium to perform some or all of the operations herein described. More specifically, the computing device reads the code and/or data from the computer-readable storage medium and executes the code and/or uses the data when performing the described operations.

A computer-readable storage medium can be any device or medium or combination thereof that stores code and/or data for use by a computing device. For example, the computer-readable storage medium can include, but is not limited to, volatile memory or non-volatile memory, including flash memory, random access memory (eDRAM, RAM, SRAM, DRAM, DDR, DDR2/DDR3/DDR4 SDRAM, etc.), read-only memory (ROM), and/or magnetic or optical storage mediums (e.g., disk drives, magnetic tape, CDs, DVDs). In the described embodiments, the computer-readable storage medium does not include non-statutory computer-readable storage mediums such as transitory signals.

In some embodiments, one or more hardware modules are configured to perform the operations herein described. For example, the hardware modules can comprise, but are not limited to, one or more processors/cores/central processing units (CPUs), application-specific integrated circuit (ASIC) chips, field-programmable gate arrays (FPGAs), caches/cache controllers, compute units, embedded processors, graphics processors (GPUs)/graphics cores, pipelines, Accelerated Processing Units (APUs), and/or other programmable-logic devices. When such hardware modules are activated, the hardware modules perform some or all of the operations. In some embodiments, the hardware modules include one or more general-purpose circuits that are configured by executing instructions (program code, firmware, etc.) to perform the operations.

In some embodiments, a data structure representative of some or all of the structures and mechanisms described herein (e.g., computing device 100 and/or some portion thereof) is stored on a computer-readable storage medium that includes a database or other data structure which can be read by a computing device and used, directly or indirectly, to fabricate hardware comprising the structures and mechanisms. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates/circuit elements from a synthesis library that represent the functionality of the hardware comprising the above-described structures and mechanisms. The netlist may then be placed and routed to produce a data set describing geometric shapes to be applied to masks. The masks may then be used in various semiconductor fabrication steps to produce a semiconductor circuit or circuits corresponding to the above-described structures and mechanisms. Alternatively, the database on the computer accessible storage medium may be the netlist (with or without the synthesis library) or the data set, as desired, or Graphic Data System (GDS) II data. In the following description, functional blocks may be referred to in describing some embodiments. Generally, functional blocks include one or more interrelated circuits that perform the described operations. In some embodiments, the circuits in a functional block include circuits that execute program code (e.g., microcode, firmware, etc.) to perform the described operations.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A method for controlling operation of a computing device that comprises a first entity and a second entity, comprising:
   in a management controller, performing operations for:
      dynamically setting a power-state limit for the first entity based on a performance coupling and a thermal coupling between the first entity and the second entity, the setting comprising adjusting one or more settings for the first entity to cause the first entity to operate at the power-state limit, and the performance coupling determined based at least in part on a gradient of a performance metric for the second entity;
      wherein the performance coupling represents a portion of operations being performed by each of the first entity and the second entity while processing corresponding parts of a shared workload, wherein, for the shared workload, the first entity and the second entity are delayed when the other of the first entity and the second entity are performing operations for the shared workload at less than a first rate for the first entity and at less than a second rate for the second entity.

2. The method of claim 1, wherein dynamically setting the power-state limit for the first entity based on the performance coupling and the thermal coupling between the first entity and the second entity comprises:
   during operation of the first entity and the second entity,
      at a first interval, setting the power-state limit for the first entity based on a temperature of the second entity; and
      at a second interval, setting the power-state limit for the first entity based on the performance metric for the second entity.

3. The method of claim 2, wherein setting the power-state limit for the first entity based on the temperature of the second entity comprises:
   when the temperature of the second entity is not at or above a threshold temperature, leaving a current power-state limit of the first entity unchanged; and
   when the temperature of the second entity is at or above a threshold temperature, setting the power-state limit for the first entity by:

when a performance metric for the first entity is above a threshold value, setting the power-state limit for the first entity to a highest power-state limit from a set of power-state limits; and when the performance metric for the first entity is below the threshold value, setting the power-state limit to a middle power-state limit from the set of power-state limits.

4. The method of claim 3, wherein the performance metric for the first entity represents a portion of operations being performed by the first entity for the shared workload in the computing device.

5. The method of claim 2, wherein setting the power-state limit for the first entity based on the performance metric for the second entity comprises:

when the gradient of the performance metric for the second entity is below a threshold, decrementing the power-state limit for the first entity; and when the gradient of the performance metric for the second entity is at or above a threshold, incrementing the power-state limit for the first entity.

6. The method of claim 5, wherein the performance metric for the second entity represents a portion of operations being performed by the second entity for the shared workload in the computing device.

7. The method of claim 5, wherein setting the power-state limit for the first entity based on the performance metric for the second entity further comprises:

monitoring a number of times that the power-state limit for the first entity has been toggled, each toggle comprising one of:

an increment of the power-state limit for the first entity followed by a corresponding decrement of the power-state limit for the first entity; or a decrement of the power-state limit for the first entity followed by a corresponding increment of the power-state limit for the first entity;

when a number of toggles in the power-state limit in a specified time exceeds a threshold, preventing one or more subsequent toggles.

8. The method of claim 5, further comprising:

computing the gradient of the performance metric for the second entity by:

based on two or more records of prior measurements of the performance metric at two or more corresponding different times, computing a long-term average and a short-term average of the performance metric for the second entity; and computing the gradient of the performance metric for the second entity based on the long-term average and the short-term average.

9. The method of claim 1, wherein the gradient of the performance metric for the second entity is between a long-term moving average and a short-term moving average of the performance metric for the second entity.

10. A processor, comprising:

a first entity and a second entity; and a management controller coupled to the first entity and the second entity, wherein the management controller is configured to dynamically set a power-state limit for the first entity based on a performance coupling and a thermal coupling between the first entity and the second entity, the setting comprising adjusting one or more settings for the first entity to cause the first entity to operate at the power-state limit, and the performance coupling determined based at least in part on a gradient of a performance metric for the second entity;

wherein the performance coupling represents a portion of operations being performed by each of the first entity and the second entity while processing corresponding parts of a shared workload, wherein, for the shared workload, the first entity and the second entity are delayed when the other of the first entity and the second entity are performing operations for the shared workload at less than a first rate for the first entity and at less than a second rate for the second entity.

11. The processor of claim 10, wherein, when dynamically setting the power-state limit for the first entity based on the performance coupling and the thermal coupling between the first entity and the second entity, the management controller is configured to:

during operation of the first entity and the second entity, at a first interval, set the power-state limit for the first entity based on a temperature of the second entity; and at a second interval, set the power-state limit for the first entity based on the performance metric for the second entity.

12. The processor of claim 11, wherein, when setting the power-state limit for the first entity based on the temperature of the second entity, the management controller is configured to:

when the temperature of the second entity is not at or above a threshold temperature, leave a current power-state limit of the first entity unchanged; and when the temperature of the second entity is at or above a threshold temperature, set the power-state limit for the first entity by:

when a performance metric for the first entity is above a threshold value, setting the power-state limit for the first entity to a highest power-state limit from a set of power-state limits; and when the performance metric for the first entity is below the threshold value, setting the power-state limit to a middle power-state limit from the set of power-state limits.

13. The processor of claim 12, wherein the performance metric for the first entity represents a portion of operations being performed by the first entity for the shared workload in the processor.

14. The processor of claim 11, wherein, when setting the power-state limit for the first entity based on the performance metric for the second entity, the management controller is configured to:

when the gradient of the performance metric for the second entity is below a threshold, decrement the power-state limit for the first entity; and when the gradient of the performance metric for the second entity is at or above a threshold, increment the power-state limit for the first entity.

15. The processor of claim 14, wherein the performance metric for the second entity represents a portion of operations being performed by the second entity for the shared workload in the processor.

16. The processor of claim 14, wherein, when setting the power-state limit for the first entity based on the performance metric for the second entity, the management controller is further configured to:

monitor a number of times that the power-state limit for the first entity has been toggled, each toggle comprising one of:

an increment of the power-state limit for the first entity followed by a corresponding decrement of the power-state limit for the first entity; or a decrement of the power-state limit for the first entity followed by a corresponding increment of the power-state limit for the first entity;

when a number of toggles in the power-state limit in a specified time exceeds a threshold, prevent one or more subsequent toggles.

17. The processor of claim 14, further comprising:
computing the gradient of the performance metric for the second entity by:
    based on two or more records of prior measurements of the performance metric at two or more corresponding different times, computing a long-term average and a short-term average of the performance metric for the second entity; and
    computing the gradient of the performance metric for the second entity based on the long-term average and the short-term average.

18. The processor of claim 10, wherein the gradient of the performance metric for the second entity is between a long-term moving average and a short-term moving average of the performance metric for the second entity.

19. A computing device, comprising:
a processor;
a memory coupled to the processor, the memory configured to store instructions and data for the processor;
a first entity and a second entity coupled to the processor; and
a management controller coupled to the processor, wherein the management controller is configured to dynamically set a power-state limit for the first entity based on a performance coupling and a thermal coupling between the first entity and the second entity, the setting comprising adjusting one or more settings for the first entity to cause the first entity to operate at the power-state limit and the performance coupling determined based at least in part on a gradient of a performance metric for the second entity;

wherein the performance coupling represents a portion of operations being performed by each of the first entity and the second entity while processing corresponding parts of a shared workload, wherein, for the shared workload, the first entity and the second entity are delayed when the other of the first entity and the second entity are performing operations for the shared workload at less than a first rate for the first entity and at less than a second rate for the second entity.

20. The computing device of claim 19, wherein, when dynamically setting the power-state limit for the first entity based on the performance coupling and the thermal coupling between the first entity and the second entity, the management controller is configured to:
    during operation of the first entity and the second entity,
        at a first interval, set the power-state limit for the first entity based on a temperature of the second entity; and
        at a second interval, set the power-state limit for the first entity based on the performance metric for the second entity.

* * * * *